US008362399B2

(12) United States Patent
Seaborn

(10) Patent No.: US 8,362,399 B2
(45) Date of Patent: Jan. 29, 2013

(54) WINDSHIELD HEATER

(76) Inventor: W. John Seaborn, Longmont, CO (US)

( * ) Notice: Subject to any disclaimer, the term of this patent is extended or adjusted under 35 U.S.C. 154(b) by 399 days.

(21) Appl. No.: 12/709,917

(22) Filed: Feb. 22, 2010

(65) Prior Publication Data

US 2011/0204037 A1 Aug. 25, 2011

(51) Int. Cl.
*B60L 1/02* (2006.01)

(52) U.S. Cl. ......................... 219/203; 219/202; 219/549

(58) Field of Classification Search .................. 219/106, 219/203, 549, 202; 29/611

See application file for complete search history.

(56) References Cited

U.S. PATENT DOCUMENTS

| | | | | |
|---|---|---|---|---|
| 3,757,087 | A * | 9/1973 | Bernard | 219/549 |
| 4,815,198 | A * | 3/1989 | Ramus | 29/611 |
| 5,099,104 | A * | 3/1992 | Holzer et al. | 219/203 |
| 5,434,384 | A * | 7/1995 | Koontz | 219/203 |
| 5,451,280 | A * | 9/1995 | Gillner | 156/106 |
| 6,791,066 | B2 * | 9/2004 | Hawk | 219/203 |
| 2008/0203078 | A1 * | 8/2008 | Huerter | 219/203 |

* cited by examiner

*Primary Examiner* — Kenneth Parker
*Assistant Examiner* — Fang-Xing Jiang
(74) *Attorney, Agent, or Firm* — The von Hellens Law Firm, Ltd.

(57) ABSTRACT

A windshield heater for heating the bottom section of a vehicle windshield includes a heating element located proximate the windshield selectively energized by direct current from the electrical circuit of the vehicle. The heater may be a heating element directly adhered to the windshield. Alternatively, the heater may include a sleeve enveloping the length of the heating element and a corresponding length of compressible material to lodge the heater between the windshield and the adjacent section of a dashboard to place the heating element proximate the windshield.

22 Claims, 3 Drawing Sheets

WINDSHIELD HEATER

BACKGROUND OF THE INVENTION

1. Field of the Invention

The present invention relates to electrically energized heaters for vehicular windshields and, more particularly, to a heater for heating the lower edge of a windshield.

2. Description of Related Prior Art

During the winter, vehicles, whether land based watercraft or aircraft, are subject to snowfall and icing. This is a particular problem when visibility through the front windshield is obscured or otherwise compromised by snow and icing. For decades, this problem has been addressed by hot air defrosters urging a flow of air against the interior surface of the windshield to heat the windshield. The windshields are usually of glass and as glass is a poor conductor of heat, a significant period of time elapses before the snow and/or ice adjacent the exterior surface of the windshield melts. Windshield wipers, wiping the exterior surface of a windshield generally provide the area of contact relatively clear of snow and ice.

Presently used defrosters which emit air from one or more slots or vents in the dashboard of a vehicle generally direct the heated air against the windshield upwardly from a location significantly above the bottom edge of the windshield. Similarly, windshield wipers generally do not produce a wiping action against the exterior surface of the windshield close to the bottom edge of the windshield. Under severe conditions when a vehicle may have not been used for a period of time, sufficient ice may have formed along the bottom of a windshield to encase the windshield wipers and prevent their operation.

The lack of visibility along the lower part of a vehicular windshield compromises the view of the operator of the vehicle. Such compromise is a distinct safety hazard which is exacerbated during periods of severe inclement weather, whether by heavy snowfall or very low temperatures causing rapid and sustained icing.

SUMMARY OF THE INVENTION

The present invention is directed to a heater for heating the lower part of a vehicular windshield to cause melting of any snow or ice formed thereupon. A heating element may be directly adhered to the bottom interior surface of the windshield to transmit heat by conduction to the windshield to cause warming of this section of the windshield and the melting of any ice or snow on the corresponding exterior surface of the windshield. Alternatively, the heating element, in combination with compressible material, may be enveloped within a sleeve positioned between the lower part of the windshield and an adjacent surface of a dashboard extending from the windshield. Electric power for the heating elements may be temporarily or permanently provided by the electrical system of the vehicle.

It is therefore a primary object of the present invention to provide a heater for heating the lower part of a vehicular windshield.

Another object of the present invention is to provide a heater that may be temporarily secured adjacent the lower edge of a vehicular windshield.

Still another object of the present invention is to provide a heater adhered to the inside surface of the lower edge of a windshield.

Yet another object of the present invention is to provide a heater lodged in place between a windshield and the adjacent dashboard of a vehicle to maintain a heating element proximate the inside of the windshield.

A further object of the present invention is to provide a windshield heater for melting ice and snow on the lower outside surface of a vehicular windshield with a heater located adjacent the inside surface of the windshield.

A still further object of the present invention is to provide a windshield heater selectively connectable to the electrical system of a vehicle.

A yet further object of the present invention is to provide a method for melting snow and ice along the lower edge of a vehicular windshield.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
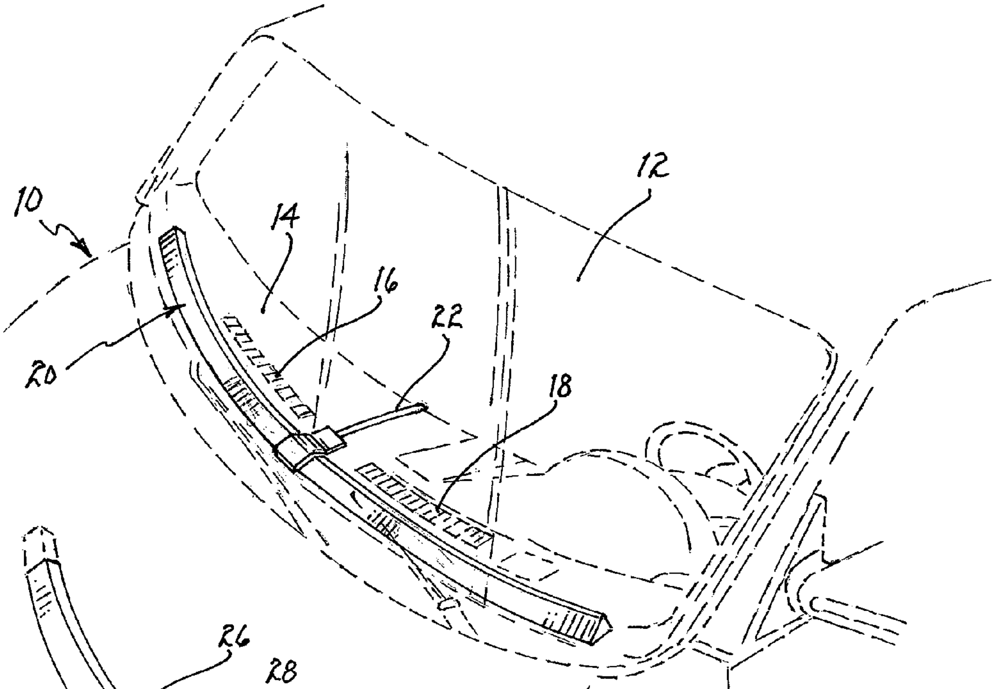
FIG. 1 illustrates the windshield of a conventional land based vehicle having the present invention mounted between the windshield and the adjacent dashboard.

Referring to FIG. 1, there is illustrated in dashed lines a representative automobile 10, which may be a sedan. It includes a conventional windshield 12 that may be more or less curved laterally and have a greater or lesser slant rearwardly. Dashboard 14 includes vents 16 and 18 to channel hot air onto the inside surface of the windshield for defrosting purposes. While the present invention is primarily directed to use in a land-based vehicle, such as automobile 10 or a truck 80 (see FIG. 8), it could just as well be used in an aircraft or in a watercraft. That is, most aircraft and many watercraft include a windshield and a dashboard extending therefrom having vents incorporated therein for defrosting purposes.

Windshield heater 20 for the sedan shown in FIG. 1 is located at the junction between windshield 12 and dashboard 14 generally in contact with the interior surface of the windshield. Conductors 22 engage the heater with a source of electric power in automobile 10, which may be a conventional socket for a cigarette lighter. Upon energisation of the windshield heater, it will transmit by conduction heat to the interior surface of the windshield. This heat will migrate through the windshield and warm the outside surface. Any snow or ice adjacent this warmed surface will melt.

Figure 2:
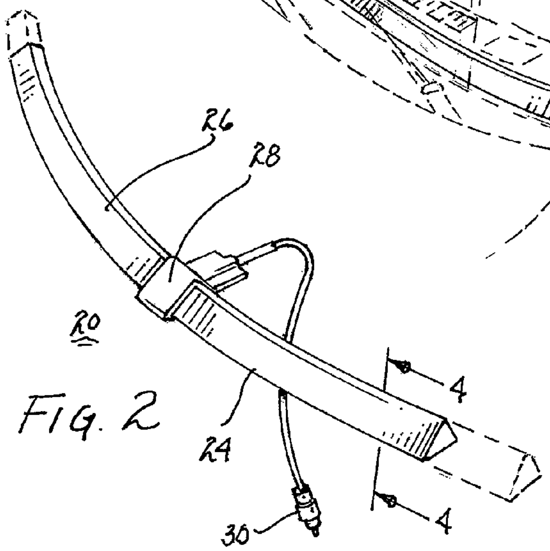
FIG. 2 illustrates an embodiment of the windshield heater.
Figure 4:
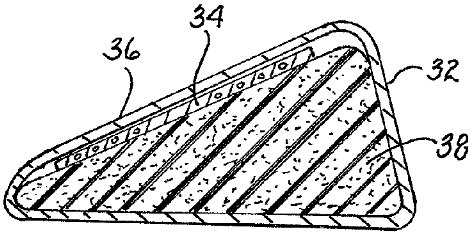
FIG. 4 is a cross sectional view taken along lines 4-4, as shown in FIG. 2.

Referring jointly to FIGS. 2 and 4, certain features attendant windshield heater 20 will be described. The heater includes left and right sections, 24, 26, respectively, extending laterally from junction 28. Conductors 22 extend from the junction and may terminate in plug 30 adapted for insertion into a conventional cigarette lighter socket. Thus, control of operation of the windshield heater is primarily a function of whether plug 30 is or is not in engagement with the cigarette lighter socket; however, a switch may be incorporated. Each of left and right sections 24, 26 include a sleeve 32 generally triangular cross section. A heating element 34 is located adjacent side 36 of the sleeve and maintained thereagainst by compressible material 38 having a generally triangular cross section.

Figure 3:
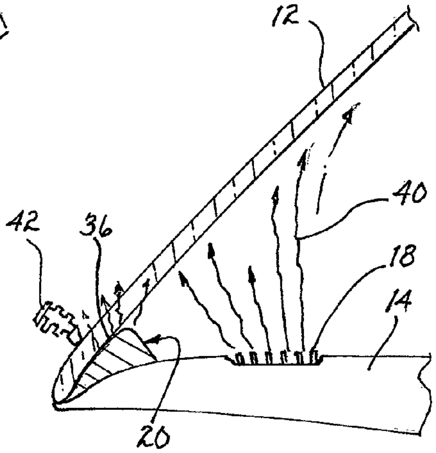
FIG. 3 illustrates a partial cross section of the windshield heater mounted between the windshield and the dashboard of a vehicle.

Referring to FIG. 3, there is illustrated in cross section the windshield heater mounted in place. For most passenger cars, windshield 12 slopes rearwardly at a fairly large angle. Dashboard 14 extends forwardly to the base of the windshield. Vent 18 discharges heated air, represented by a plurality of arrows 40 directed generally upwardly from the vent. A windshield wiper 42, when at rest, is generally horizontally orientated and located proximate the lower edge of windshield 12, as illustrated. By inspection, the flow of heated air, represented by arrows 40, is upwardly toward the windshield and the heated air flows upwardly along the inside surface of the windshield. The lower part of the windshield is generally not directly heated by the outflowing heated air. Thus, any heating along the lower edge of the windshield occurs only through migration of heat downwardly through the windshield. As glass is generally a poor conductor of thermal energy, there is little warming along the lower edge of the windshield. Moreover, the motion of conventional windshield wipers generally does not extend to the lower edge of the windshield and the resulting non-wiped area of the windshield is subject to accumulation of snow and ice. Furthermore, if the automobile has been standing for some time during a snowfall and subsequent icing, the windshield wipers may become encased in ice and immovable by the windshield wiper motor.

By lodging windshield heater 20 at the apex between dashboard 14 and windshield 12, as illustrated in FIG. 3, contact with the lower inside surface of the windshield is established. By urging the heater toward the apex, compressible material 38 will become compressed, as illustrated, to firmly lodge the windshield heater in place and maintain side 36 of the enveloping sleeve adjacent the windshield to locate heating element 34 proximate the windshield.

Upon energizing the windshield heater, heating element 34 will heat by conduction the lower edge and section of the windshield. This heat will migrate through the windshield and heat the exterior surface resulting in melting of any snow or ice that may be lodged thereupon. This heating will also melt the ice that may have captured windshield wiper 32 to free it and thereafter permit it to perform its function.

Figure 5:
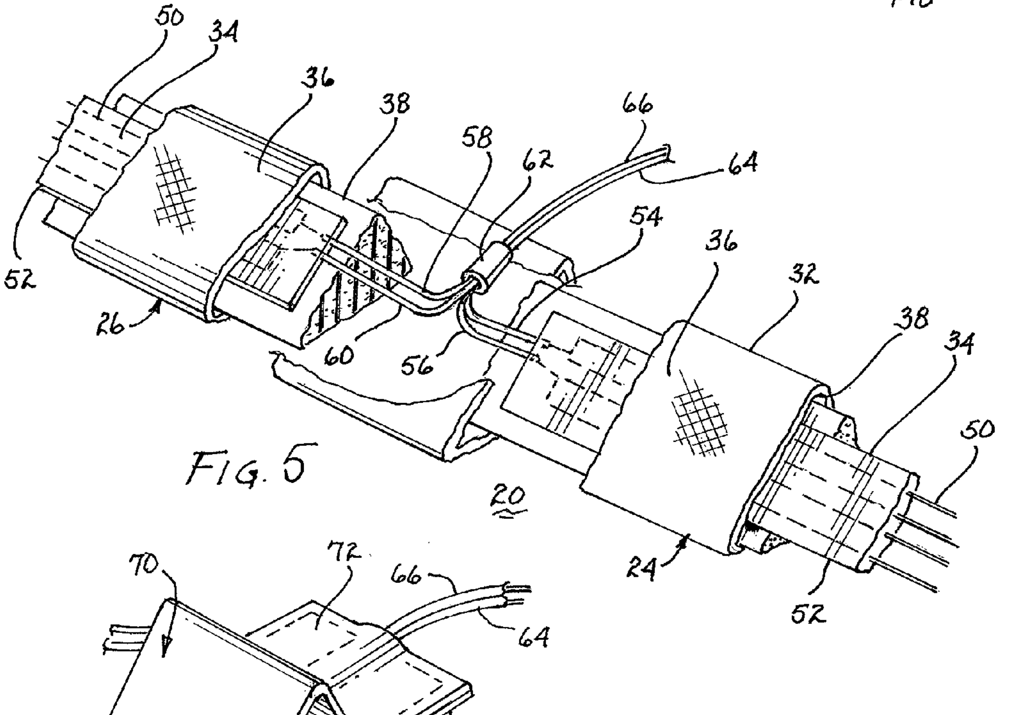
FIG. 5 illustrates details attendant the junction of two heating elements of the heater shown in FIG. 2.
Figure 6:
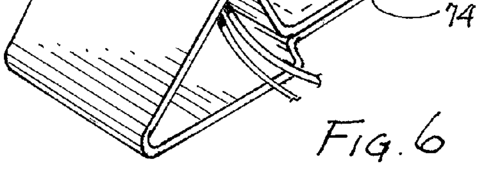
FIG. 6 illustrates a protected covering disposed at the junction between two heating elements shown in FIG. 5.

Referring jointly to FIGS. 5 and 6, details of windshield heater 20 will be described. Left and right sections 24, 26 are essentially mirror images of one another. Each section includes compressible material 38 supporting heating element 34, both of which are enveloped within sleeve 32. Each of heating elements 34 includes the one or more wires which are thermally responsive to electric current transmitted thereto. That is, as electric current is applied, the temperature of the wire will rise. For example, wire having such characteristic and often used as a heating element is known as nichrome wire. The wire or wires may be embedded in a serpentine configuration within a strip 52 of material which, for example, may be man-made. Various other support structures for wires 50 may be employed that will conduct heat and maintain the wires in their appropriate orientation. Wire 50 is electrically connected to a pair of conductors 54, 56. Similar conductors 58, 60 are electrically connected to wires 50 embedded in strip 52 in right section 26. Conductors 54 and 58 are electrically connected to one another in junction 62 and conductors 56 and 60 are also connected to one another within junction 62. Thereby, the two heating elements are electrically connected in parallel. A pair of conductors 64, 66 correspond with conductor 22 shown in FIG. 1.

FIG. 6 primarily illustrates a shield 70 extending about the junction between left and right sections 24, 26 of windshield heater 20 for purposes of protecting the electrical connections therebetween. This shield extends about the enclosed ends of the left and right sections (as shown in FIG. 2) and includes two flat sections 72, 74 joined to one another for supporting junction 62 and conductors 64, 66 extending therefrom to protect the enclosed conductors and prevent damage to and displacement thereof.

Figure 7:
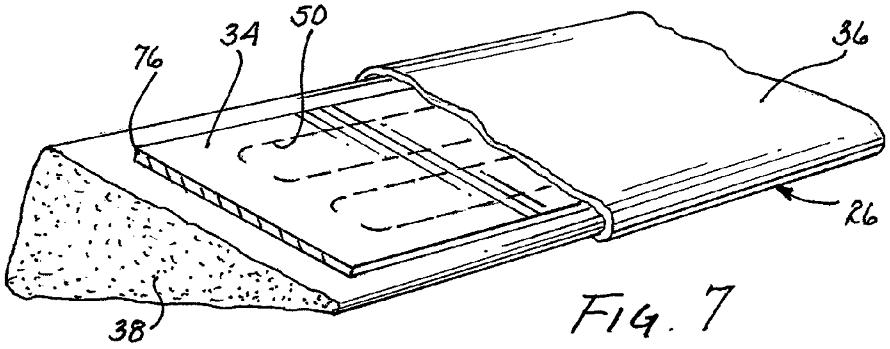
FIG. 7 is a partial cutaway view illustrating components of the heater.

FIG. 7 illustrates outer end 76 of heating element 34 in left section 26. Compressible material 38 may be terminated proximate end 36, as illustrated, to fit the width of the windshield and dashboard of the land based vehicle, aircraft or watercraft wherein the windshield heater is used. The terminal end of right section 24 is similarly configured.

Figure 8:
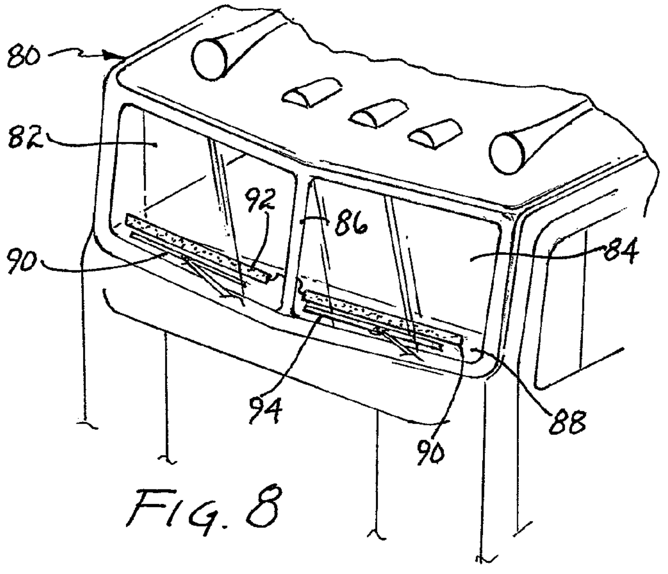
FIG. 8 illustrates a truck having a windshield with minimal slope and a windshield heater located thereon.

Referring to FIG. 8, there is shown a conventional truck 80 which may be of the type generally know as an 18-wheeler. Trucks of this type generally include split windshields 82, 84 separated by a bar 86. These windshields are generally near vertical. Dashboard 88 may include two or more vents 90, 92 for directing heated air onto the interior surfaces of the windshields. As described above, the lower section of each windshield generally is not subjected to the defrosting heated air from the vents. Consequently, snow and ice will tend to form and collect along the lower edges of the windshield. Furthermore, windshield wipers 94, 96 travel through their arc beginning at a location above the bottom of the windshield. This creates a serious problem of ice and snow collecting along the bottom of each windshield and interferes with a downward line of sight for the driver.

Figure 9:
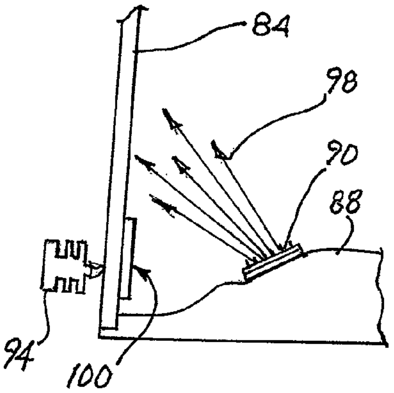
FIG. 9 is a representative cross sectional view illustrating the location of the heater with respect to the windshield and dashboard of a truck.

As illustrated in FIG. 9, vent 90 disposed in dash 88, directs heated air, represented by arrow 98, to the middle and upper part of windshield 84. The lower part of the windshield, as represented by the location of wiper 94, generally does not receive heated air for purposes of defrosting the windshield and melting the snow and ice at the lower part of the windshield. By locating a heating element 100 adjacent the lower part of windshield 84, this part of the windshield will be warmed and any snow or ice collecting on the outside thereof will melt. Such melting will also release the windshield wipers (84) preventing encrusting snow or ice.

Figure 11:
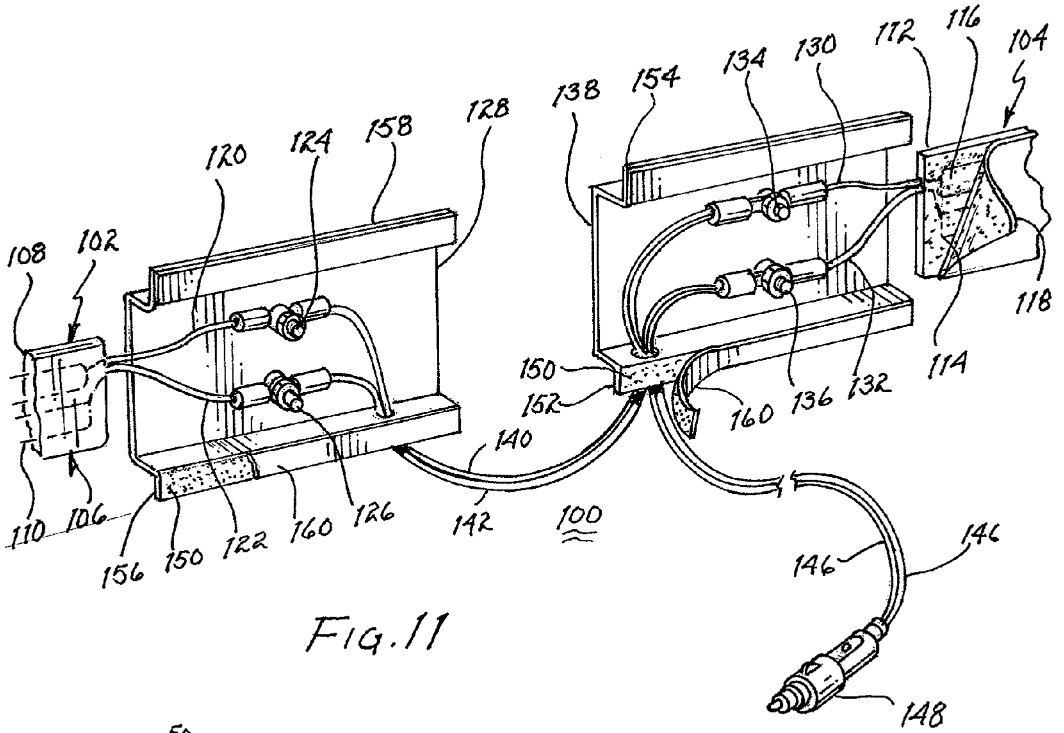
FIG. 11 illustrates further details of the embodiment of the heater shown in FIG. 10.
Figure 10:
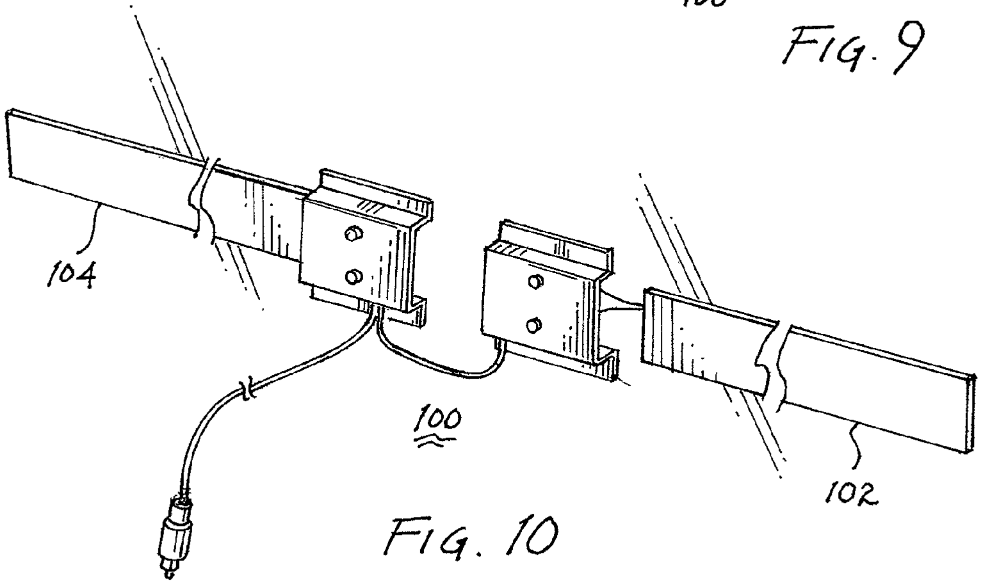
FIG. 10 illustrates an embodiment of the present invention particularly suitable for use with the windshield of a truck.

FIGS. 10 and 11 illustrate a heating element 100 usable with a truck of the type depicted in FIG. 8. The heating element includes a left section 102 and a right section 104. Section 102 includes a heating element 106 formed by a strip 108 of man-made material encasing one or more wires 110, which wires are thermally responsive to electric current flowing therethrough. Section 104 includes a similar strip 112 having one or more wires 114 embedded therein, which wires are thermally responsive to electric current passing therethrough. Wires 104, 112 may be embedded in a serpentine configuration. To secure sections 102, 104 a contact adhesive 116 is disposed on one side of strip 112. A similar contact adhesive (not shown) is disposed on one side of section 102. Prior to use, this adhesive is protected by a peel strip 118 as shown with respect to section 104.

Electrical conductors 120, 122 interconnect wire 110 with respective posts 124, 126 mounted on a bracket 128. Similarly, electrical conductors 130, 132 interconnect with the ends of wire 114 within strip 112 and are attached to posts 134, 136 mounted on bracket 138. Electrical conductors 140, 142 extend from posts 124, 126 to posts 134, 136, respectively. A further pair of conductors 144, 146 extend from posts 134, 136 to a conventional plug 148 for engagement with a conventional cigarette lighter socket in truck 80. Thereby, the wires within sections 102, 104 are connected in parallel and receive electrical power from the truck.

As representatively illustrated in FIG. 10, brackets 128, 138 may be attached to their respective windshields by contact adhesive 150 disposed on flanges 152, 154 of bracket 138 and on flanges 156 and 158 of bracket 128. Prior to use, peel strips 160 may be used to protect the underlying contact adhesive. By use of contact adhesive, the sections and brackets of heater 100 are readily detachably attached to the split windshield of a truck, as depicted in FIG. 9.

I claim:

1. A windshield heater for heating the lower segment of a windshield extending upwardly from a dashboard, said heater comprising in combination:
- a) a heating element in the form of a strip of material enveloping a length of wire thermally responsive to application of electrical power;
- b) a length of compressible material adjacent said heating element and a sleeve for enveloping said heating element and said compressible material, whereby said heater may be compressed and lodged between the dashboard and the windshield;
- c) an electric circuit for applying electrical power to said wire; and
- d) means for locating said strip adjacent the segment of the windshield.

2. A windshield heater as set forth in claim 1 wherein said strip is of man-made material.

3. A windshield heater as set forth in claim 2 wherein said wire defines a serpentine path within said strip.

4. A windshield heater as set forth in claim 2 including an adhesive disposed on one side of said strip for adhering said strip to the windshield.

5. A windshield heater as set forth in claim 4 wherein said circuit includes a plug for connection to a source of electrical power.

6. A windshield heater as set forth in claim 5 including an electrical junction for electrically connecting said plug with said wire.

7. A windshield heater as set forth in claim 1 wherein said length of compressible material is triangular in lateral cross section.

8. A method for applying heat to a windshield of a vehicle, said method comprising in combination:
- a) placing a heating element responsive to electrical power in proximity to the surface of the windshield;
- b) enveloping the heating element within a sleeve;
- c) inserting a length of compressible material within the sleeve;
- d) locating the sleeve between the windshield and a dashboard of the vehicle to compress the material and to locate the heating element in proximity to the windshield, whereby the material urges the heating element against the windshield;
- e) applying electrical power to the heating element; and
- f) transferring heat from the heating element to the windshield.

9. A method as set forth in claim 8 including the step of detachably attaching the heating element to the surface of the windshield.

10. A method as set forth in claim 8 including two heating elements and wherein said step of securing includes the step of locating the two heating elements in general longitudinal alignment with one another.

11. A method as set forth in claim 10 wherein said step of applying includes the step of electrically interconnecting the two heating elements intermediate the two heating elements.

12. A method as set forth in claim 10 wherein said step of securing includes the step of adhering the heating element to the surface of the windshield.

13. A windshield heater for a vehicle comprising in combination:
- a) a strip incorporating a heating element, said heating element including a length of compressible material for lodging said heater between the lower section of the windshield and an adjacent surface;
- b) means for locating said strip in proximity to the windshield;
- c) said heating element being thermally responsive to application of electrical power; and
- d) a conductor for conveying electrical power to said heating element.

14. A windshield heater as set forth in claim 13 wherein said heating element includes an adhesive for adhering said strip adjacent the windshield.

15. A windshield heater as set forth in claim 14 wherein said strip includes a wire element thermally responsive to application of electric power to convey heat to the windshield.

16. A windshield heater as set forth in claim 13 wherein said strip includes a wire element thermally responsive to application of electric power to convey heat to the windshield.

17. A windshield heater as set forth in claim 16 including a sleeve enveloping said heating element and said compressible material.

18. A windshield heater as set forth in claim 13 wherein said heating means includes a length of compressible material for holding said heater intermediate the lower section of the windshield and an area of a dashboard of the vehicle to position and retain said heating element in proximity to the windshield.

19. A windshield heater as set forth in claim 17 wherein said strip includes a wire element thermally responsive to application of electric power to convey heat to the windshield.

20. A windshield heater as set forth in claim 18 including a sleeve enveloping said heating element and said compressible material.

21. A windshield heater as set forth in claim 13 including an adhesive for adhering said heating element to the windshield.

22. A windshield heater as set forth in claim 21 wherein said strip includes a wire element thermally responsive to application of electric power to convey heat to the windshield.

* * * * *